(12) United States Patent
Alkislar et al.

(10) Patent No.: US 7,966,826 B2
(45) Date of Patent: Jun. 28, 2011

(54) SYSTEMS AND METHODS FOR REDUCING NOISE FROM JET ENGINE EXHAUST

(75) Inventors: Mehmet B. Alkislar, Bellevue, WA (US); George W. Butler, Seattle, WA (US); David H. Reed, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 11/707,217

(22) Filed: Feb. 14, 2007

(65) Prior Publication Data

US 2009/0320487 A1    Dec. 31, 2009

(51) Int. Cl.
*F02K 1/00* (2006.01)
(52) U.S. Cl. ............... 60/770; 181/213; 239/265.17
(58) Field of Classification Search ............ 60/204, 60/226.1, 770, 785, 782, 39.5; 181/213, 181/220; 239/265.17, 265.39
See application file for complete search history.

(56) References Cited

U.S. PATENT DOCUMENTS

| | | | |
|---|---|---|---|
| 3,648,800 A | 3/1972 | Hoerst | |
| 3,721,314 A | 3/1973 | Hoch et al. | |
| 4,215,536 A | 8/1980 | Rudolph | |
| 4,372,110 A | 2/1983 | Fletcher et al. | |
| 4,487,017 A | 12/1984 | Rodgers | |
| 4,819,425 A | 4/1989 | Farquhar et al. | |
| 5,117,628 A * | 6/1992 | Koshoffer | 60/226.1 |
| 5,884,472 A | 3/1999 | Presz, Jr. et al. | |
| 5,924,632 A | 7/1999 | Seiner et al. | |
| 5,947,412 A | 9/1999 | Berman | |
| 6,082,635 A | 7/2000 | Seiner et al. | |
| 6,314,721 B1 | 11/2001 | Mathews et al. | |
| 6,360,528 B1 | 3/2002 | Brausch | |
| 6,532,729 B2 | 3/2003 | Martens | |
| 6,612,106 B2 | 9/2003 | Balzer | |
| 6,640,537 B2 | 11/2003 | Tse et al. | |
| 6,658,839 B2 | 12/2003 | Hebert | |
| 6,718,752 B2 | 4/2004 | Nesbitt et al. | |
| 6,751,944 B2 | 6/2004 | Lair | |
| 6,786,037 B2 | 9/2004 | Balzer | |

(Continued)

FOREIGN PATENT DOCUMENTS

EP    0913567 A2    5/1999

(Continued)

OTHER PUBLICATIONS

International Search Report and Written Opinion; International Patent Application No. PCT/US08/52527; Filed Jan. 30, 2008; Applicant: The Boeing Company; Mailed on Oct. 2, 2008.

(Continued)

*Primary Examiner* — Michael Cuff
*Assistant Examiner* — Andrew Nguyen
(74) *Attorney, Agent, or Firm* — Perkins Coie LLP

(57) ABSTRACT

Jet engine nozzles with projections (e.g., chevrons) and injected flow, and associated systems and methods are disclosed. A method in accordance with one embodiment includes generating a first flow of gas with a jet engine, delivering the first flow through a nozzle having a trailing edge perimeter that includes multiple projections extending in an aft direction, and injecting a pressurized second flow of fluid into the first flow proximate to the projections. In other embodiments, other mixing enhancement devices (e.g., vortex generators) are carried by the projections. It is expected that the combination of the projections and the mixing enhancement devices will reduce engine exhaust noise levels below the levels achievable with either projections or injected flow individually.

22 Claims, 4 Drawing Sheets

U.S. PATENT DOCUMENTS

| | | | |
|---|---|---|---|
| 6,813,877 | B2 | 11/2004 | Birch et al. |
| 6,837,456 | B1 | 1/2005 | Shih et al. |
| 6,969,028 | B2 | 11/2005 | Dun |
| 6,971,229 | B2 | 12/2005 | Lair |
| 7,010,905 | B2 | 3/2006 | Lair |
| 7,055,329 | B2 | 6/2006 | Martens et al. |
| 7,093,423 | B2 | 8/2006 | Gowda et al. |
| 7,114,323 | B2 | 10/2006 | Schlinker et al. |
| 7,246,481 | B2 | 7/2007 | Gutmark et al. |
| 7,293,401 | B2 | 11/2007 | Papamoschou |
| 7,310,939 | B2 | 12/2007 | Prouteau et al. |
| 7,469,529 | B2 | 12/2008 | Feuillard et al. |
| 7,520,124 | B2 | 4/2009 | Narayanan et al. |
| 7,637,095 | B2 | 12/2009 | Winter et al. |
| 2002/0178711 | A1 | 12/2002 | Martens |
| 2003/0182925 | A1 | 10/2003 | Lair |
| 2003/0201366 | A1 | 10/2003 | Connelly et al. |
| 2004/0074224 | A1 | 4/2004 | Hebert |
| 2004/0088967 | A1 | 5/2004 | Webster et al. |
| 2004/0237501 | A1 | 12/2004 | Brice et al. |
| 2005/0188676 | A1 | 9/2005 | Lair |
| 2008/0078159 | A1 | 4/2008 | Thomas et al. |
| 2008/0134665 | A1 | 6/2008 | Birch et al. |
| 2008/0272228 | A1 | 11/2008 | Mengle et al. |

FOREIGN PATENT DOCUMENTS

| | | |
|---|---|---|
| EP | 0984152 A2 | 3/2000 |
| EP | 1367249 A | 12/2003 |
| EP | 1482160 A1 | 12/2004 |
| EP | 1580418 | 9/2005 |
| EP | 1703114 A1 | 9/2006 |
| EP | 1905998 A2 | 4/2008 |
| FR | 2091911 | 1/1971 |
| GB | 2146702 A | 4/1985 |
| GB | 2149456 A | 6/1985 |
| GB | 2207468 | 2/1989 |
| WO | WO-02/29232 | 4/2002 |
| WO | WO-2005021934 A2 | 3/2005 |

OTHER PUBLICATIONS

U.S. Appl. No. 11/502,130, filed Aug. 9, 2006, Mengle.

Bultemeier et al., "Effect of Uniform Chevrons on Cruise Shockcell Noise," AIAA-2006-2440 27th Aeroacoustics Conference, Cambridge, Massachussetts, May 8-10, 2006, 15 pages.

Thomas et al., "Jet-Pylon Interaction of High Bypass Rario Separate Flow Nozzle Configurations," 10th AIAA/CEAS Aeroacoustics Conference, Manchester, U.K., May 2004, pp. 1-16.

Alkislar, Mehmet et al., "Significant Improvements in Jet Noise Reduction using Chevron—Microjet Combination," American Institute of Aeronautice and Astronautics, (2007), 5 pgs.

Alkislar, Mehmet et al., "The Effect of Streamwise Vortices on the Aeroacoustics of a Mach 0.9 Jet.," Nov. 7, 2006, Department of Mechanical Engineering, Tallahassee, FL, 47 pgs.

Arakeri, V.H. et al., "On the use of microjets to suppress turbulence in a Mach 0.9 axisymmetric jet," J. Fluid Mech. (2003), vol. 490, pp. 75-98, Cambridge University Press.

Bridges, James et al., "Parametric testing of chevrons on single flow hot jets," AIAA 2004-2824, 10th AIAA/CEAS Aeroacoustics Conference, May 10, 2004, 17 pgs.

Dash, S.M. et al., "CFD Support for Jet Noise Reduction Concept Design and Evaluation for F/A 18 E/F Aircraft," Combustion Research and Flow Technology, Inc. (2005), 6 pgs.

Greska, et al., "The Effects of Microjet Injection on an F404 Jet Engine," AIAA 2005-3047, 11th AIAA/CEAS Aeroacoustics Conference, May 23-25, 2005, Monterey, California, 23 pgs.

Krothapalli, A., "Aeroacoustics of Twin Supersonic Impinging Jets," AIAA Conference, May 12, 2003, 11 pgs.

Saiyes, Naseem H. et al., "Acoustics and Thrust of Quiet Separate-Flow High-Bypass-Ratio Nozzles," AIAA Journal, vol. 41, No. 3, Mar. 2003, pp. 372-378.

Aeroacoustics, Aerospace Sciences, Aerospace America, Dec. 2005, 1 pg.

Mengle, Vinod G., "Jet Noise Characteristics of Chevrons in Internally Mixed Nozzles," AIAA 2005-2934, 11th AIAA/CEAS Conference, May 23-25, 2005, Monterey, CA; 15 pgs.

Mengle, Vinod G., "Relative Clocking of Enhanced of Mixing Devices of Jet Noice Benefit," AIAA-2005-996; AIAA Meeting, Jan. 10-13, 2005, Reno, NV; 14 pgs.

Massey, Steven J., "Computational Analysis of a Chevron Nozzle Uniquely Tailored for Propulsion Airframe Aeroacoustics;" AIAA 2006-2436, 12th AIAA/CEAS Conference, May 8-10, 2006, Cambridge, MA, 23 pgs.

Mengle, Vinod G. et al., "Flight Test Results for Uniquely Tailored Propulsion-Airframe Aeroacoustic Chevrons; Shockcell Noice," AIAA 2006-2439, 12th AIAA/CEAS Conference, May 8-10, 2006, Cambridge, MA; 17 pgs.

Mengle, Vinod G., "Internal Flow and Noise of Chevrons and Lobe Mixers in Mixed-Flow Nozzles," AIAA 2006-623, 44th AIAA Meeting; Jan. 9-12, 2006, Reno, NV, 17 pgs.

Nesbitt, Eric et al., "Flight Test Results for Uniquely Tailored Propulsion-Airframe Aeroacoustic Chevrons; Community Noise," AIAA 2006-2438, 12th AIAA/CEAS Conference, May 8-10, 2006; Cambridge, MA, 13 pgs.

Massey, S. J. et al, "Computational Analyses of Propulsion Aeroacoustics for Mixed Flow Nozzle Pylon Installation at Takeoff," NASA/CR 2001-211056, Sep. 2001.

Mengle, Vinod G., "Reducing Propulsion Airframe Aeroacoustic Interactions with Uniquely Tailored Chevrons: 1. Isolated Nozzles," AIAA 2006-2467; 12th AIAA/CEAS Conference, May 8-10, 2006, Cambridge, MA, 18 pgs.

Mengle, Vinod G. et al., "Reducing Propulsion Airframe Aeroacoustic Interactions with Uniquely Tailored Chevrons: 3. Jet-Flap Interaction," AIAA 2006-2435, 12th AIAA/CEAS Conference, May 8-10, 2006, Cambridge, MA, 15 pgs.

Mengle, Vinod G. et al., "Reducing Propulsion Airframe Aeroacoustic Interactions with Uniquely Tailored Chevrons: 2. Installed Nozzles," 12th AIAA/CEAS Conference, May 8-10, 2006, Cambridge, MA, 14 pgs.

Janardan, B.A. et al., AST Critical Propulsion and Noise Reduction Technologies for Future Commercial Subsonic Engines, NASA CR 2000-210039, Dec. 2000, 300 pgs.

Results of NASA Aircraft Noise Research; <http://www.aero-space.nasa.gov/vsp/QTD2.htm>; accesses Jul. 12, 2006, 2 pgs.

Thomas, Russell H. et al., "Computational Analysis of Pylon-Chevron Core Nozzle Interaction," pp. 1-12, AIAA/CEAS Aeroacoustics Conference, May 2001, Maastricht, The Netherlands.

Wallace, James, "Boeing makes 'quiet' advances," Seattle PI, Aug. 11, 2005, 4 pgs.

\* cited by examiner

SYSTEMS AND METHODS FOR REDUCING NOISE FROM JET ENGINE EXHAUST

TECHNICAL FIELD

The present disclosure is directed generally toward systems and methods for reducing noise (e.g., broadband noise) from jet engines, including via nozzles having chevrons or other projections augmented with proximate injected flows, and/or other mixing enhancement arrangements.

BACKGROUND

Aircraft manufacturers are under continual pressure to reduce the noise produced by aircraft in order to satisfy increasingly stringent noise certification rules. Aircraft engines are a major contributor to overall aircraft noise. Accordingly, aircraft engines in particular have been the target of manufacturers' noise reduction efforts. Aircraft engines have been made significantly quieter as a result of advanced high bypass ratio engines. These engines derive a significant fraction of their total thrust not directly from jet exhaust, but from bypass air which is propelled around the core of the engine by an engine-driven forwardly mounted fan. While this approach has significantly reduced aircraft noise when compared with pure turbojet engines and low bypass ratio engines, engine and aircraft federal regulations nevertheless continue to require further engine noise reductions.

Several techniques have been used to reduce engine exhaust noise. One approach to reducing engine noise is to tailor the amount of mixing between the high velocity gasses exiting the engine, and the surrounding freestream air. A particular technique includes forming "chevrons" at the nozzle exit. Chevrons generally include serrations at the nozzle lip, typically triangular in shape and having some curvature in the lengthwise direction, which slightly immerses them in the adjacent flow. The chevrons can project either inwardly or outwardly, by an amount that is on the order of the upstream boundary layer thickness on the inner or outer surface, respectively. The chevrons can be located at the trailing edge of the nozzle core flow duct (through which the engine core flow is directed), and/or the trailing edge of the fan flow duct, which is arranged annularly around the core flow duct, and through which the fan bypass air passes. The chevrons typically reduce the low-frequency noise by tailoring the rate at which the nozzle flow streams mix with the surrounding freestream air at the length scale of the nozzle diameter. Another technique, which may produce a similar noise reduction is to apply high pressure fluid jets (e.g., microjets) at or near the nozzle exit. While the foregoing approaches have resulted in appreciable noise reduction compared with nozzles that do not include chevrons or fluid injection, further noise reduction is desired to meet community noise standards, and to reduce cabin noise.

SUMMARY

The following summary is provided for the benefit of the reader only, and is not intended to limit in any way the invention as set forth by the claims. Particular aspects of the disclosure are directed to jet engine nozzles that include both trailing edge projections (e.g., chevrons), and proximately-located flow injection apertures, along with associated systems and methods. One method for controlling aircraft engine nozzle flow includes generating a first flow of gas with a jet engine and delivering the first flow through a nozzle having a trailing edge perimeter that includes multiple projections (e.g., chevrons) extending in an aft direction. The method can further include injecting a pressurized second flow of fluid into the first flow at least proximate to the projections. In a particular aspect of this method, the projections have a generally triangular shape with a tip region positioned aft of a base region. The second flow is injected at a position axially aligned with the tip region in a streamwise direction. In still a further particular aspect, the second flow can be changed or halted based at least in part on an engine operating parameter, an aircraft flight condition, or both. For example, the second flow can be reduced or halted when the aircraft is at a cruise flight condition. In other aspects, the second flow can be varied (e.g., pulsed).

Another aspect is directed to a method for making an aircraft nozzle system. One such method is applied to a nozzle having an exit with an exit perimeter shape that varies in a circumferential direction, and includes identifying target locations around the nozzle exit perimeter where turbulent kinetic energy production levels of jet flow at the nozzle exit are expected to be higher than an average of turbulent kinetic energy production levels around the perimeter. The method can further include positioning mixing enhancement devices (e.g., vortex generators, elongated extensions, and/or fluid injection apertures) at the target locations. In a particular aspect, the nozzle includes projections at the exit perimeter, the projections having a generally triangular shape with a tip positioned aft of a base. Positioning the mixing enhancement devices can include positioning individual flow injection apertures to be axially aligned with corresponding projection tips in a streamwise direction, with the apertures located aft of the corresponding tips and being angled inwardly at an acute angle relative to the corresponding tips.

A method in accordance with another aspect includes generating a flow of gas with a jet engine and delivering the flow through a nozzle having a trailing edge perimeter including multiple projections extending in an aft direction. The method still further includes increasing flow vorticity, decreasing shear stress, or both adding to vorticity and decreasing shear stress at locations proximate to the projections. In still further aspects, the flow vorticity is increased and/or the shear stress is decreased at tip regions of the projections via mixing enhancement devices. The mixing enhancement devices can include vortex generators, elongated extensions, and/or fluid injection ports.

Still another aspect is directed to an aircraft system that includes a jet engine exhaust nozzle having an exit aperture with a perimeter that includes multiple projections extending in an aft direction. The system can further include multiple flow injection passages having apertures positioned at least proximate to the projections, with the flow injection passages being coupled to a source of pressurized gas.

In further particular aspects, the system can also include at least one valve coupled to at least one of the flow injection passages to control flow through the at least one passage. The system can further include a controller operatively coupled to the at least one valve, with the controller programmed to receive input corresponding to an engine operating condition, a flight condition, or both. The controller is also programmed to direct the valve based at least in part on the input.

Yet another aspect is directed to an aircraft system that includes a jet engine nozzle having an exit aperture with a perimeter that includes multiple projections extending in an aft direction. The system further includes mixing enhancement devices carried by the projections, with the mixing enhancement devices being positioned to increase vorticity, decrease shear stress, or both increase vorticity and decrease shear stress at locations proximate to the projections. For example, the mixing enhancement devices can include flow injection passages having apertures positioned at least proximate to the projections and flow injection passages coupled to a source of pressurized gas. In another arrangement, the projections are generally triangular in shape with a tip positioned aft of a base, and the mixing enhancement devices include elongated extensions extending aft from the tip of the projection.

DETAILED DESCRIPTION

Aspects of the present disclosure are directed to jet engine nozzles with chevrons or other projections, and mixing enhancement devices, along with associated systems and methods. Specific details of certain embodiments are described below with reference to FIGS. 1-10B. Several details of structures or processes that are well-known and often associated with such systems and processes are not set forth in the following description for purposes of brevity. Moreover, although the following disclosure sets forth several embodiments of different aspects of the invention, several other embodiments of the invention can have different configurations or different components than those described in this section. Accordingly, the invention may have other embodiments with additional elements and/or without several of the elements described below with reference to FIGS. 1-10B.

Figure 1:
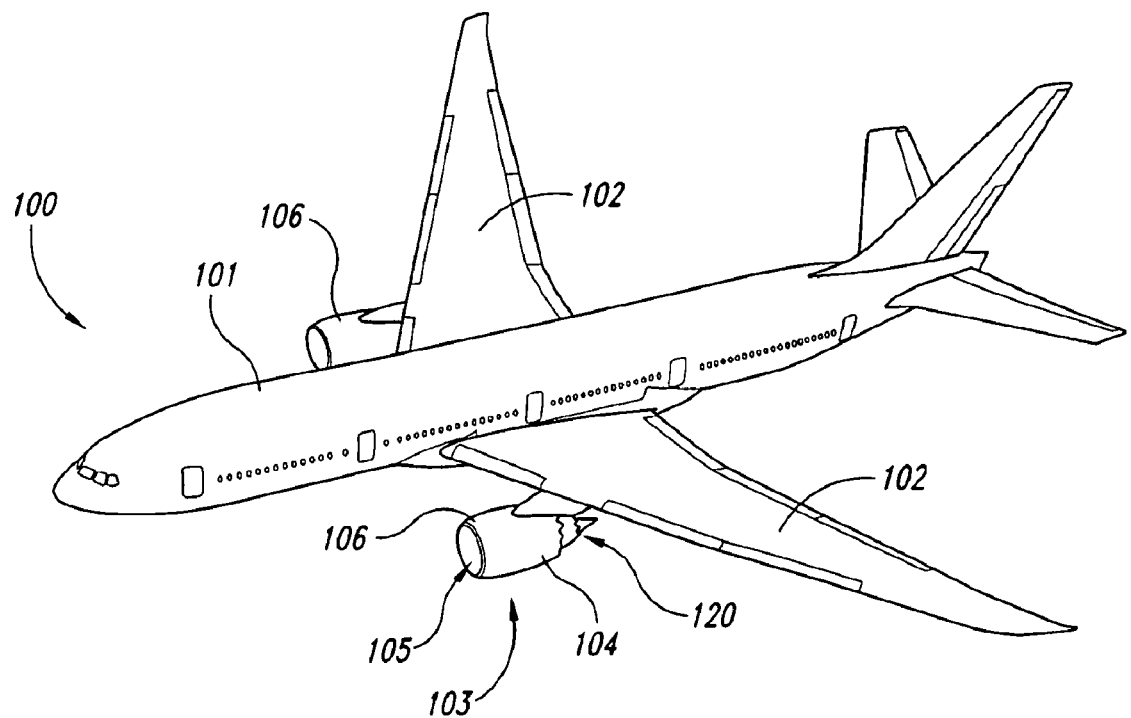
FIG. 1 illustrates an aircraft having nozzles configured in accordance with an embodiment of the invention.

FIG. 1 is an illustration of a commercial jet transport aircraft 100 having wings 102, a fuselage 101, and a propulsion system 103. The illustrated propulsion system 103 includes two engines 106 carried by the wings 102. Each engine 106 is housed in a nacelle 104, which includes an inlet 105 and a nozzle 120. The nozzles 120 include both aft-extending projections and injected flow or other mixing enhancement arrangements, discussed in greater detail below, that reduce the noise generated by the engines 106. The noise reduction achieved by these features may be applied to engines carried in the configuration shown in FIG. 1, or, alternatively, may be applied to engines carried in accordance with other configurations, including those discussed later with reference to FIG. 6.

Figure 2:
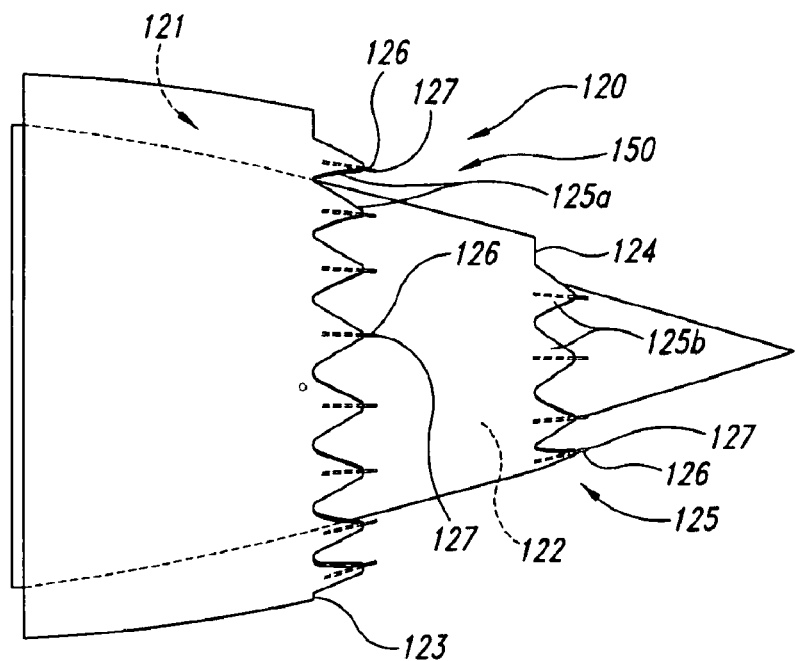
FIG. 2 illustrates a nozzle having projections and flow injection passages configured in accordance with an embodiment of the invention.

FIG. 2 is an enlarged side elevation view of the nozzle 120 shown in FIG. 1, configured in accordance with an embodiment of the invention. The nozzle 120 can include a core flow path 122 that carries engine exhaust products, and a fan flow path 121 disposed annularly around the core flow path 122 for conveying bypass fan flow air. The core flow path 122 terminates at a core flow exit 124, and the fan flow path 121 terminates at a fan flow exit 123. Either or both of the exits 123, 124 can include projections 125, having a "chevron" shape or another shape that is arranged to enhance mixing between the gas streams merging at the corresponding exit. For purposes of illustration, the nozzle 120 is shown with both fan flow projections 125a and core flow projections 125b, but in particular installations, one or the other of these sets of projections 125a, 125b may be eliminated. In any of these embodiments, some or all of the projections 125 can include a corresponding mixing enhancement device 150. In a particular arrangement, the mixing enhancement device 150 includes a flow injection passage 126 (a portion of which is shown in hidden lines in FIG. 2) having a passage aperture 127. The flow injection passages 126 carry high pressure fluid (e.g., a gas, such as air, or a liquid) and are oriented in a generally aftward direction proximate to the projections 125. As is discussed in greater detail later, the combination of the projections 125 and the high pressure flow introduced by the flow injection passages 126 (or other mixing enhancement device) is expected to reduce engine noise by an amount greater than that achievable with either projections or flow injection alone. Mixing enhancement devices that include injected flows are described further below with reference to FIGS. 3-8B, and other mixing enhancement devices are described later with reference to FIGS. 9A-10B.

Figure 3:
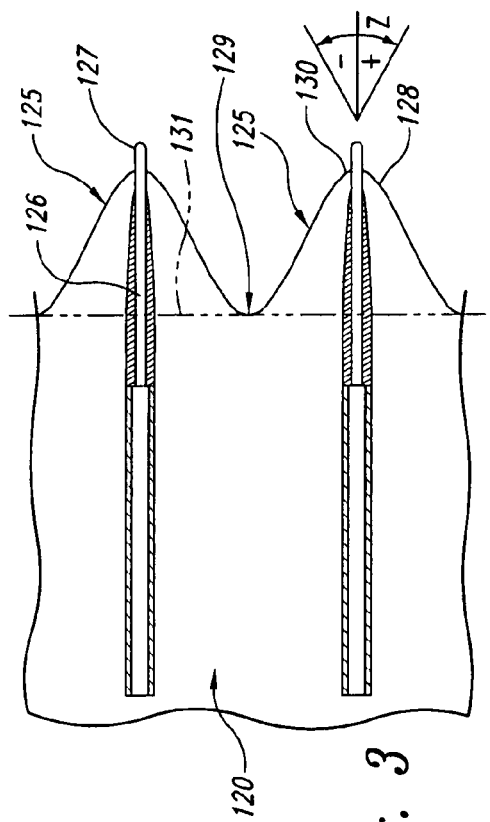
FIG. 3 is an enlarged plan view of a portion of a nozzle having projections and flow injection passages in accordance with an embodiment of the invention.

FIG. 3 is an enlarged plan view of a portion of the nozzle 120 illustrating representative projections 125 configured in accordance with an embodiment of the invention. In this particular embodiment, the projections 125 have a generally chevron or triangular shape, with a tip region 128 positioned aft of a base region 129. The tip region 128 of each projection 125 terminates at an aft-most tip 130. In a particular aspect of this embodiment, the flow injection passages 126 and the associated passage apertures 127 are axially aligned (in a streamwise direction) with the tip region 128. It is believed that this location for the passage apertures 127 will improve the noise reduction capability of the nozzle 120 when compared with other locations for the passage apertures 127. In particular, it is believed that the turbulent kinetic energy production of the nozzle flow adjacent to the projections 125 is higher near the tips 130 than near the base regions 129. It is further believed that the turbulent kinetic energy production levels are reduced by the introduction of high pressure, microjet injected flow. Accordingly, the passage aperture 127 can be deliberately positioned at or near the tip 130 to compensate for the expected relatively high turbulent kinetic energy production level at this location. It is further expected that this arrangement will reduce sound levels below the levels achievable with the projections 125 alone.

As is also shown in FIG. 3, individual passage apertures 127 can be positioned aft of the corresponding tips 130. In a particular embodiment, the passage apertures 127 are located just aft of tips 130. For example, each passage aperture 127 can be located downstream of the corresponding tip 130 by a distance of about 20% of the axial length of the projection 125. In other embodiments, the passage aperture 127 can be located at the tip 130, or just upstream of the tip 130, though it is expected that the downstream location will produce better noise reduction in at least some embodiments. Accordingly, in still further embodiments, the passage aperture 127 can be positioned downstream of the corresponding tip 130 by a distance of up to about one nozzle diameter (e.g., the diameter of the nozzle 120 at the perimeter location from which the projection 125 extends). For purposes of illustration, a single flow injection aperture 127 is shown for an individual projection 125; in other embodiments, individual projections include multiple apertures 127 side-by-side near the tip 130. This arrangement can reduce the size of each aperture 127 and associated flow passage 126, without reducing the injected mass flow. The apertures 127 can be oriented to have a zero azimuthal angle Z (as shown in FIG. 3) or a non-zero azimuthal angle in other embodiments. The azimuthal angle Z may be non-zero when the projection 125 includes a single aperture 127, and/or when the projection 125 includes multiple apertures 127. In the latter case, the apertures 127 on a given projection 125 may be directed toward each other or away from each other.

In addition to housing the flow injection passages 126, the projections 125 may, in at least some embodiments, also be movable relative to the rest of the nozzle 120. For example, the projections 125 can pivot along a hinge line 131 relative to the rest of the nozzle 120 to alter the degree to which each projection 125 is immersed in (e.g., inclined relative to) the upstream nozzle flow. In another arrangement, the projections 125 can be formed from a resilient flexible material and, when actuated, form a continuously curved, immersed surface, rather than a surface with a discontinuity at the hinge line 131. As will be discussed below with reference to FIG. 4, the noise reduction and overall efficiency of the nozzle 120 can be adjusted by adjusting the flow through the flow injection passages 126, optionally in combination with adjusting the orientation of the projections 125.

Figure 4:
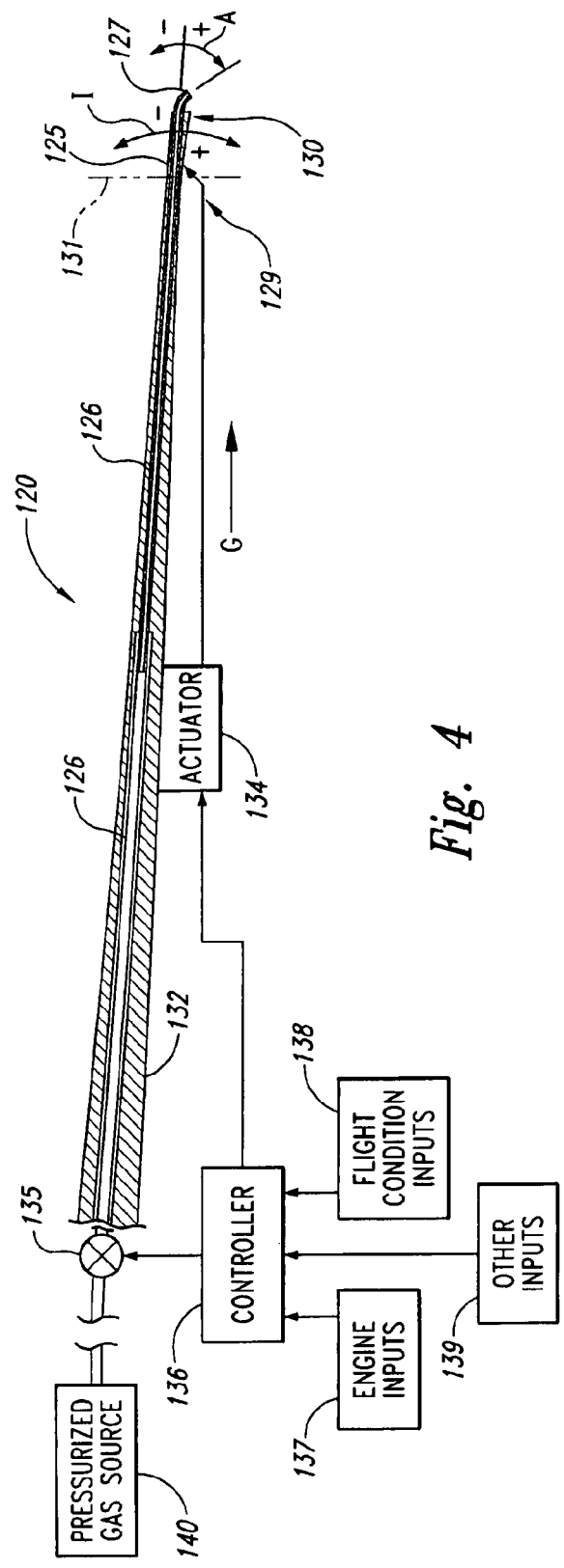
FIG. 4 is a partially schematic, cross-sectional side view of a nozzle projection and associated flow injection passage, along with control devices configured in accordance with an embodiment of the invention.

FIG. 4 is a partially schematic, side cross-sectional view of a portion of the nozzle 120, one of the projections 125, and the associated flow injection passage 126. The flow injection passage 126 is coupled to a source 140 of pressurized gas. The source 140 can provide compressed air or another gas (e.g., exhaust gas) to the flow injection passage 126. In a particular embodiment, the source 140 can include the engine compressor, which provides compressed air to the flow injection passage 126 via a bleed air port. In other embodiments, high pressure air can be provided by other sources, e.g., an aircraft auxiliary power unit (APU).

As discussed above, the passage aperture 127 can be axially aligned in a streamwise direction with the tip 130 of the projection 125. As is shown in FIG. 4, the flow axis of the flow injection passage 126 at the passage aperture 127 can be inclined by an angle A relative to the adjacent flow direction of gas passing along an inner surface 132 of the nozzle 120 (indicated by arrow G). The inclination angle A can be an acute angle having a selected value of between 0° and ±90°. In a particular embodiment, the inclination angle A is about 60° relative to the internal gas flow direction G. The particular inclination angle A selected for the passage aperture 127 can have other values in other embodiments, and can be selected for a particular installation based on factors that can include the nozzle pressure ratio, particular nozzle geometry features, and the shape of the projection 125, among other factors. For example, when the projection 125 is immersed inwardly (as shown in FIG. 4), angle A can have a positive value. In a multi-stream installation (e.g., with a bypass flow stream located annularly outwardly from a core flow stream), the projection 125 may be located between the two streams and immersed in an outward direction into the bypass flow stream. In such an instance, angle A may have a negative value. In a particular embodiment, the passage aperture 127 is round. In other embodiments, the shape and/or size of the passage aperture 127 can be different, depending, for example, upon the size of the engine and nozzle, and/or installation details.

Aspects of the projections 125 and/or the flow injection passages 126 may be selectively changed and/or otherwise controlled during operation. For example, when the projections 125 are movable relative to the rest of the nozzle 120, the nozzle 120 can include one or more actuators 134 that are coupled to the projections 125 to rotate them (as indicated by arrow I) in a manner that alters the degree of immersion for each projection 125. The projections 125 can be controlled so as to move independently of each other, or all together.

To accommodate the relative motion of the projections 125, and also to accommodate other movable features of the nozzle 120 (including but not limited to thrust reverser features), at least some portions of the flow injection passages 126 can include flexible tubing or other adaptable, conformable and/or resilient structures. The flow injection passages 126 may also be coupled to one or more valves 135 to control the flow through each passage 126 and the associated passage aperture 127.

A controller 136 can be operatively coupled to the valves 135 and the actuator 134 to direct the operation of these components during flight. The controller 136 can receive engine inputs 137 (e.g., engine thrust levels), flight condition inputs 138 (e.g., indications of the current and/or upcoming flight condition, such as takeoff, landing, cruise, or others), and/or other inputs 139 (e.g., pilot inputs). Based on the inputs 137-139, the controller 136 can direct the motion of the projections 125 and/or the amount of flow passing through the flow passages 126. For example, at conditions for which noise reduction is of relatively high importance, the controller 136 can direct the maximum (or a relatively high) amount of flow through the flow passages 126, and, optionally, can move the projections 125 to the immersion angle expected to reduce noise by the greatest amount. Such a condition may occur during takeoff when the engine is set at or close to its maximum thrust level. At other conditions, including but not limited to cruise conditions, the need to operate the engine efficiently may outweigh the need to reduce engine noise beyond a threshold level. Accordingly, the controller 136 can reduce or halt the flow of pressurized air through the flow passages 126, and can adjust the immersion angle I of the projections 125 to be at or close to zero. In a particular embodiment, the controller 136 can include a feedback loop to control exhaust noise. For example, the other inputs 139 can include inputs from a microphone, pressure sensor or other sensor that directly or indirectly detects engine exhaust noise levels. The controller 136 then adjusts the operating parameters for the projections 125 and/or flow passages 126 to provide the desired (e.g., optimal) level of noise reduction. At any of the foregoing conditions, the flow can be varied, e.g., pulsed or otherwise directed in a time-varying manner. The foregoing parameters can be adjusted automatically based on the received inputs, and/or can be overridden, adjusted, or otherwise manipulated by the pilot. The controller 136 can accordingly include a computer having a processor, memory, input/output capabilities, and a computer-readable medium having computer-executable instructions. The function of the computer can be integrated with existing aircraft computers, or the computer can include a standalone unit that communicates with other aircraft systems.

It is typically desirable to inject the minimum amount of flow determined necessary to provide the desired noise reduction, so as to reduce the impact on engine efficiency associated with removing flow from the engine. In general, it is expected that the amount of injected flow can be less than or equal to 5% of the overall engine mass flow. For example, in particular embodiments, it is expected that the amount of injected flow can be about 1% or less (e.g., 0.5%) of the overall engine mass flow at takeoff conditions. As discussed above, the amount of injected flow can be reduced or eliminated at other engine settings and/or flight conditions.

One feature of at least some of the foregoing embodiments is that the flow of fluid (e.g., a gas or a liquid) through the flow passages 126 can be adjusted in a manner that depends upon the relative need for noise reduction and the relative need for efficient engine operation. While this arrangement can be supplemented by movable projections 125, it may also be easier to implement than movable projections, and can accordingly be used in lieu of movable projections 125. An advantage of this arrangement is that it can allow the operator to control engine noise reduction and efficiency with a relatively simple valving arrangement (e.g., the valve 135).

Another feature of at least some of the foregoing embodiments is that the flow provided by the flow passages 126 is expected to produce a significant reduction in noise when compared with the noise reduction achievable by the use of the projections 125 alone. Accordingly, the injected flow can be used in combination with the projections 125 to achieve an overall lower noise level. It is expected that the noise reduction can be achieved for broadband noise, shock cell noise, noise heard on the ground (e.g., community noise, particularly on takeoff), and/or noise heard in the aircraft (e.g., cabin noise, particularly during cruise). Alternatively, the flow injection can be used to reduce the number or change the configuration (e.g., reduce the immersion) of the projections 125, while producing a noise level reduction equal to that of a larger number or different configuration of projections alone. As a result, the injected flow can in some cases reduce the overall weight of the aircraft by reducing the number of the projections 125, and/or can improve the efficiency of the aircraft.

Still another feature of at least some of the foregoing embodiments is that the injected flow can be provided at locations that compensate for limitations associated with the projections alone. For example, test data indicate that the projections alone produce high shear and/or low (or zero) axial vorticity at the tip regions. Both of these characteristics can limit the noise reduction capabilities of the projections. Placing the injected flow at the tip regions is expected to reduce shear and/or increase axial vorticity in a manner that increases overall noise reduction.

Figure 5:
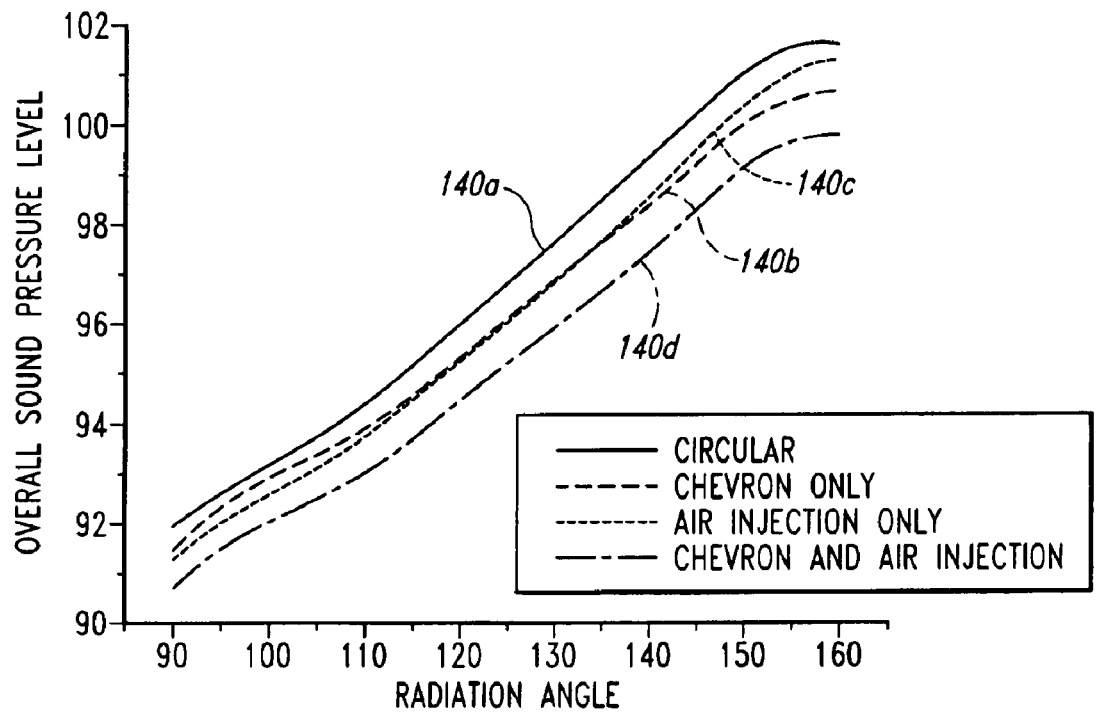
FIG. 5 is a graph illustrating test data comparing nozzles with and without projections and injected flow in accordance with an embodiment of the invention.

FIG. 5 is a graph illustrating measured noise levels for three different nozzles, as a function of angular position relative to the nozzle at a radius of 100 nozzle diameters. Accordingly, 90° on the x-axis corresponds to a position longitudinally aligned with the nozzle and laterally offset from the nozzle by 100 nozzle diameters, and 180° corresponds to a position laterally aligned with the nozzle exit, and axially (longitudinally) offset by 100 nozzle diameters downstream of the nozzle exit. Line 140a illustrates data corresponding to a standard circular nozzle, line 140b illustrates data corresponding to a nozzle having 18 conventional chevrons with a relatively mild degree of immersion, and nozzle 140c corresponds to a circular nozzle having a uniform circular exit perimeter and aft-directed flow injection exiting from the perimeter. Line 140d corresponds to a nozzle having 18 chevron shaped projections in combination with flow injected in a manner generally similar to that described above with reference to FIGS. 3 and 4. These acoustic test data indicate that the noise reduction benefit associated with a nozzle having both projections and injected flow is significantly greater than that realized by a nozzle having projections alone or flow injection alone. For example, at many of the angular locations shown in FIG. 5, the noise reduction increases from about 1 dB to about 2 dB.

Figure 6:
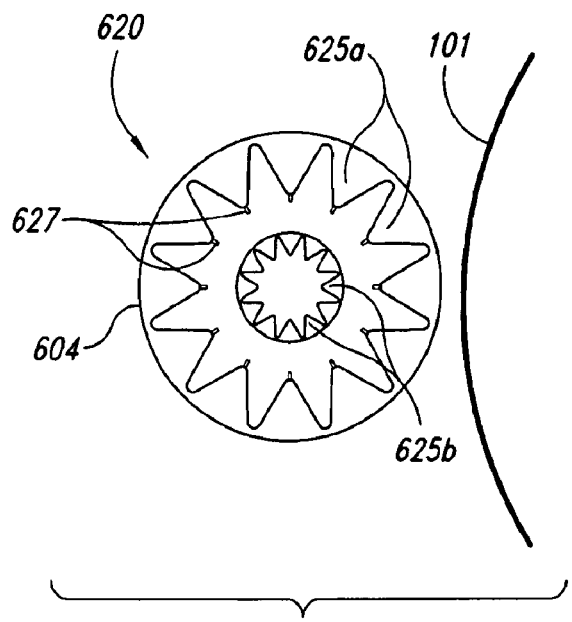
FIG. 6 is a partially schematic illustration of a nozzle positioned proximate to an aircraft fuselage in accordance with another embodiment of the invention.

FIG. 6 is a partially schematic, rear elevation view of an engine nacelle 604 and associated nozzle 620 mounted adjacent to the aircraft fuselage 101 in accordance with another embodiment of the invention. In this embodiment, the nozzle 620 can include projections 625 (shown as fan flow projections 625a and core flow projections 625b), some or all of which include flow injection passages 627 generally similar to those described above. In this embodiment, the projections 625 and flow passages 627 can be sized and configured to provide noise reduction not only for observers on the ground, but also for passengers within the fuselage 101. In other embodiments, the nacelle 604 can have other locations relative to the fuselage 101 and/or the aircraft wings, with the projections and associated flow passages tailored accordingly in a suitable manner.

The foregoing systems can reduce nozzle noise levels by adding to the axial vorticity generated by the projections and/or by decreasing the shear stress near the tips of the projections. In other embodiments, the systems can include different arrangements that achieve noise reduction by one or both of the foregoing mechanisms. Representative embodiments are described below with reference to FIGS. 7A-10B.

Figure 7A:
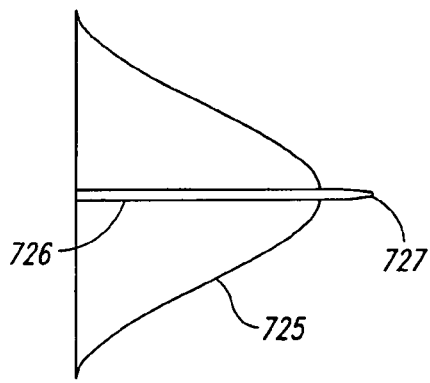
FIGS. 7A-10B illustrate nozzle projections with noise attenuation capabilities enhanced in accordance with further embodiments of the invention.
Figure 7B:
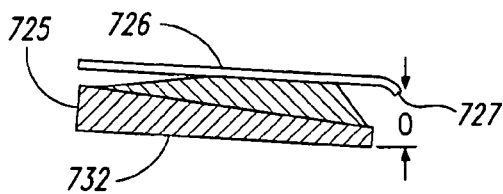

FIG. 7A is a partially schematic, plan view of a projection 725 carrying a flow injection passage 726 in accordance with another embodiment of the invention. FIG. 7B is a partially schematic, cross-sectional illustration of the projection 725 shown in FIG. 7A. Referring now to FIGS. 7A and 7B, the projection 725 includes a flow injection passage 726 having a passage aperture 727 that is offset outwardly away from an inner surface 732 of the projection 725. An aerodynamic fairing (not shown in FIGS. 7A-7B) blends the external surfaces of the flow injection passage 726 with those of the projection 725. In a particular embodiment, the passage aperture 727 is offset by a distance O outwardly from the inner surface 732, with the value selected for the distance O depending upon the size of the projection 725 and the passage aperture 727, as well as expected operating conditions for the associated nozzle. It is expected that offsetting the passage aperture 727 outwardly away from the shear layer emerging from the nozzle at the projections 725 will aid in decreasing the shear stress near the tip of the projection 725 and/or add to the axial vorticity of the flow directed aft from the projection 725.

Figure 8A:
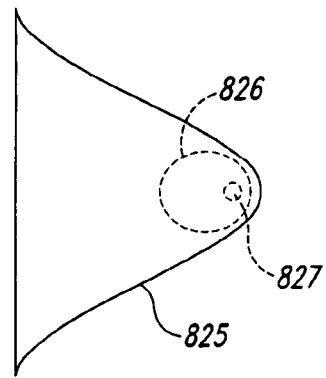
Figure 8B:
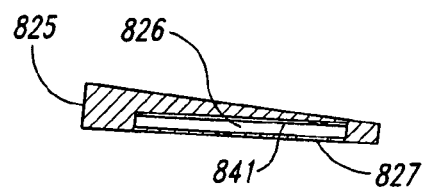

FIGS. 8A-8B illustrate a plan view and cross-sectional view, respectively, of a projection 825 that injects flow in accordance with another embodiment of the invention. In this particular arrangement, the projection 825 includes an injection chamber 826 in fluid communication with a passage aperture 827. The injection chamber 826 further includes a membrane 841 or other actuatable device (e.g., a piston) that drives flow inwardly and outwardly through the passage aperture 827. Accordingly, rather than providing a continuous flow of fluid, this arrangement produces pulses of fluid flow at the passage aperture 827. It is expected that this arrangement will have a beneficial effect on noise reduction via an increase in axial vorticity and/or a decrease in shear stress near the tip of the projection 825. An additional expected added advantage of this arrangement is that it may be simple and/or energy efficient to implement.

In the foregoing embodiments, the axial vorticity and/or shear stress levels are beneficially affected by a combination of introduced flow and projections arranged at the nozzle exit. In other embodiments, the beneficial effect provided by the projections can be enhanced by devices that need not include flow injection. Representative devices are described in further detail below with reference to FIGS. 9A-10B.

Figure 9A:
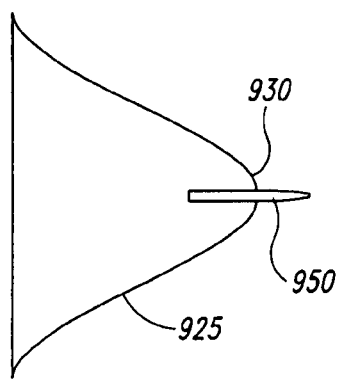
Figure 9B:
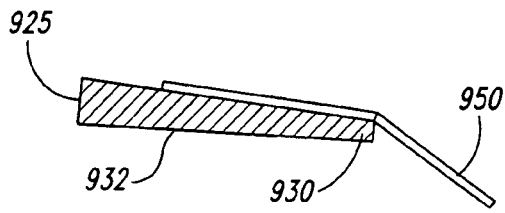

FIGS. 9A and 9B illustrate a plan view and cross-sectional view, respectively, of a projection 925 that includes a mixing enhancement device 950 positioned toward the tip 930 in accordance with an embodiment of the invention. In this particular arrangement, the mixing enhancement device 950 has an elongated pin-type configuration extending aft from the tip. The mixing enhancement device 950 is also oriented inwardly relative to an inner surface 932 of the projection 925. The mixing enhancement device is expected to add to the axial vorticity provided by the projection 925 alone (e.g., by operating as a vortex generator), and/or reduce shear stress near the tip 930 of the projection 925.

Figure 10A:
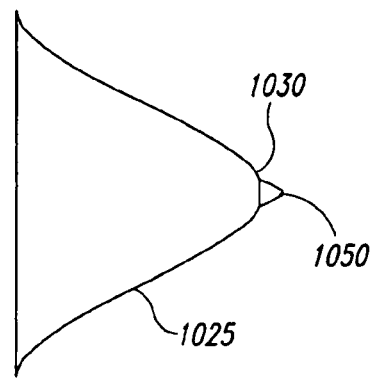
Figure 10B:
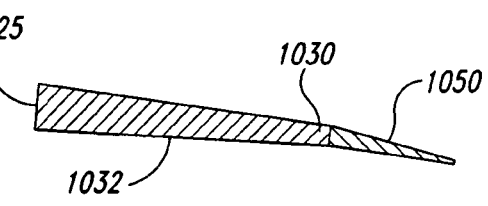

FIGS. 10A and 10B illustrate a plan view and cross-sectional view, respectively, of a projection 1025 that includes a mixing enhancement device 1050 configured in accordance with another embodiment of the invention. In this arrangement, the mixing enhancement device 1050 also projects aft of the tip 1030 and is canted inwardly relative to an inner surface 1032 of the projection 1025. The mixing enhancement device 1050 is blended or at least partially blended into the external contours of the projection 1025.

From the foregoing, it will be appreciated that specific embodiments of the invention have been described herein for purposes of illustration, but that various modifications may be made without deviating from the invention. For example, the projections can have shapes other than a triangular shape. Each projection can include more than one flow passage, and/or each flow passage can include more than one passage aperture. In particular embodiments, the passage apertures can be located flush with the tips of the corresponding projections, rather than extending downstream from the tips. Aspects of the invention described in the context of particular embodiments may be combined or eliminated in other embodiments. For example, the mixing enhancement devices and projections may be provided at one or both of the core flow exit and the fan flow exit. The mixing enhancement devices and/or projections may have characteristics that vary in a circumferential direction around the nozzle. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A method for controlling aircraft engine nozzle flow, comprising: generating a first flow of gas with a jet engine;
   delivering the first flow through a nozzle having a trailing edge perimeter including multiple projections extending in an aft direction, with individual projections having a generally triangular shape with a tip region positioned aft of a base region; and
   directing a second flow of fluid into the first flow at least proximate to the projections via a plurality of apertures, with individual apertures being axially aligned with corresponding individual tip regions in a streamwise direction, and positioned aft of the corresponding tip regions by a distance of up to about one nozzle diameter.

2. The method of claim 1 wherein directing the second flow includes directing the second flow at a non-zero acute angle relative to a flow direction of the first flow.

3. The method of claim 1 wherein directing the second flow includes directing the second flow inwardly at an angle of about 60 degrees relative to a flow direction of the first flow.

4. The method of claim 1, further comprising changing, pulsing, or halting the second flow based at least in part on an engine operating parameter, an aircraft flight condition, or both.

5. The method of claim 4 wherein changing, pulsing or halting the second flow includes reducing or halting the second flow at a cruise flight condition.

6. The method of claim 1, further comprising moving the projections relative to the engine based at least in part on an engine operating parameter, an aircraft flight condition, or both.

7. The method of claim 1 wherein directing the second flow includes directing the second flow in an amount up to about 5% of a total massflow for the engine.

8. The method of claim 1 wherein directing the second flow includes directing the second flow in an amount up to about 0.5% of a total massflow for the engine.

9. The method of claim 1 wherein the first flow produces turbulent kinetic energy production levels of jet flow at the trailing edge perimeter that vary around the perimeter relative to an average value, and wherein directing the second flow includes directing the second flow at a circumferential location where the turbulent kinetic energy production levels are higher than the average value.

10. The method of claim 1 wherein directing the second flow includes directing the second flow into a core flow of the engine.

11. The method of claim 1 wherein directing the second flow includes directing the second flow into a bypass flow of the engine.

12. A method for controlling aircraft engine nozzle flow, comprising
   generating a flow of gas with a jet engine;
   delivering the flow through a nozzle having a trailing edge perimeter including multiple projections extending in an aft direction, with individual projections having a generally triangular shape with a tip region positioned aft of a base region; and
   increasing flow vorticity, decreasing shear stress, or both increasing vorticity and decreasing shear stress at locations proximate to the projections by directing fluid into the flow of gas via a plurality of apertures, with individual apertures being axially aligned with corresponding individual tip regions in a streamwise direction, and positioned aft of the corresponding tip regions by a distance of up to about one nozzle diameter.

13. The method of claims 12 wherein increasing flow vorticity, decreasing shear stress, or both, further includes delivering the flow adjacent to vortex generators carried by the projections.

14. A method for making an aircraft nozzle system, comprising:
   for a nozzle having an exit with an exit perimeter shape that varies in a circumferential direction, identifying target locations around the nozzle exit perimeter where turbulent kinetic energy production levels of jet flow at the nozzle exit are expected to be higher than an average of turbulent kinetic energy levels around the perimeter, the nozzle including projections at the exit perimeter, the projections having a generally triangular shape with a tip region positioned aft of a base region; and
   positioning mixing enhancement devices at the target locations, including positioning individual flow injection apertures to be axially aligned with corresponding individual tip regions in a streamwise direction, and aft of the corresponding tip regions by a distance of up to about one nozzle diameter.

15. The method of claim 14 wherein the apertures are canted inwardly relative to the corresponding tip regions at an acute angle.

16. An aircraft system, comprising: a jet engine exhaust nozzle having an exit aperture, the exit aperture having a perimeter, the perimeter including multiple projections extending in an aft direction, the projections having a generally triangular shape with a tip region positioned aft of a base region; and multiple flow injection passages having apertures positioned at least proximate to the projections, the flow injection passages being coupled to a source of pressurized gas, and wherein individual apertures are axially aligned with corresponding tip regions in a streamwise direction and are positioned aft of the corresponding tip regions by a distance of up to about one nozzle diameter.

17. The system of claim 16 wherein the individual apertures are canted inwardly relative to the corresponding tip regions at an acute angle.

18. The system of claim 16 wherein individual projections are movable between a first position in which the projections are inclined relative to the adjacent nozzle flow path by a first amount, and second position in which the projections are inclined relative to the adjacent nozzle flow path by a second amount less than the first amount.

19. The system of claim 16, further comprising:
at least one valve coupled to at least one of the flow injection passages to control flow through the at least one flow injection passage; and
a controller operatively coupled to the at least one valve, the controller being programmed to receive input corresponding to an engine operating condition, a flight condition, or both, and, based at least in part on the input, direct the valve.

20. The system of claim 16 wherein the projections are positioned between a core flow path of the nozzle and a bypass flow path of the nozzle.

21. The system of claim 16 wherein the flow injection passages are coupled to an engine compressor stage.

22. An aircraft system, comprising:
a jet engine exhaust nozzle having an exit aperture, the exit aperture having a perimeter, the perimeter including multiple projections extending in an aft direction, individual projections being generally triangular in shape with a tip positioned aft of a base; and
mixing enhancement devices carried by the projections, the mixing enhancement devices being positioned to increase vorticity, decrease shear stress, or both increase vorticity and decrease shear stress at locations proximate to the projections, the mixing enhancement devices including multiple flow injection passages coupled to a source of pressurized gas and having corresponding exit apertures, wherein individual exit apertures are axially aligned in a streamwise direction with corresponding tip regions of corresponding individual projections, and positioned aft of the corresponding tip regions by a distance of up to one nozzle diameter.

* * * * *